DE WITT C. STERRY, 1st.
Improvement in Corn-Shellers.
No. 131,129. Patented Sep. 3, 1872.
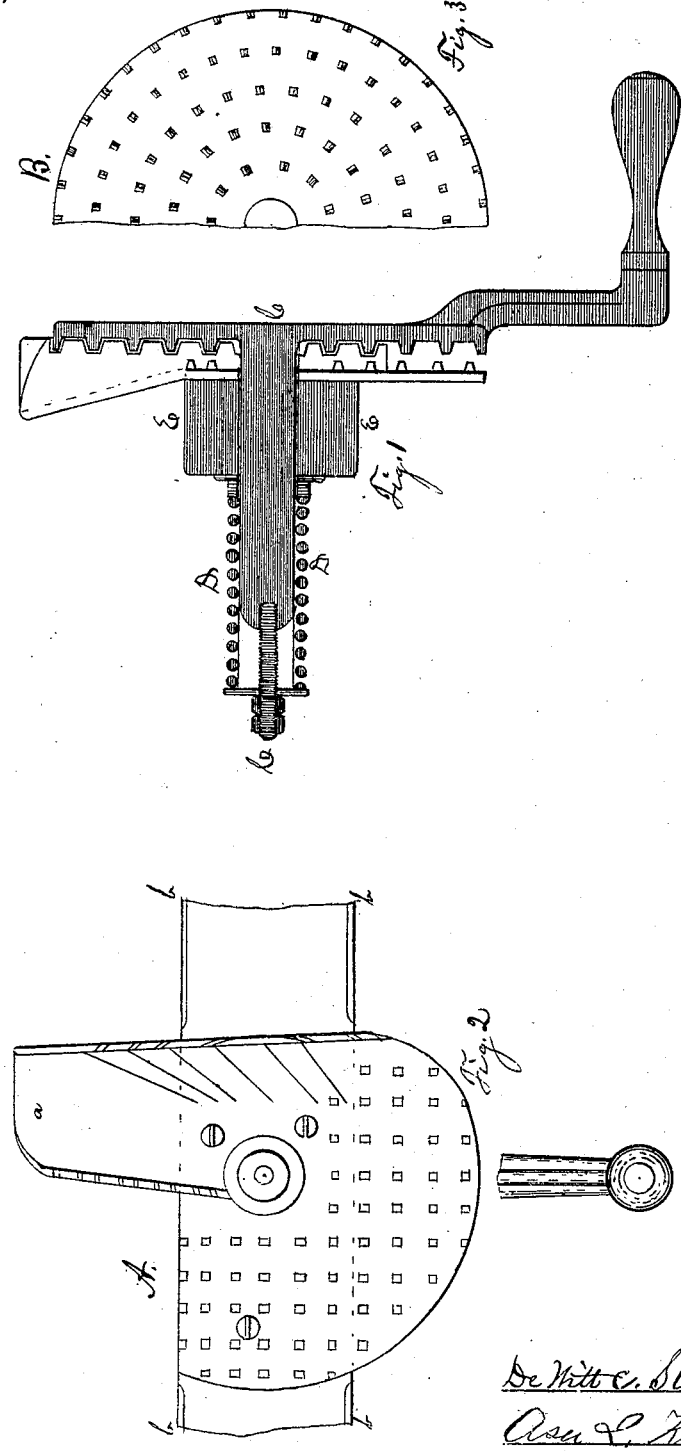
ATTEST.

UNITED STATES PATENT OFFICE.

DE WITT C. STERRY, 1ST, OF WORCESTER, MASSACHUSETTS.

IMPROVEMENT IN CORN-SHELLERS.

Specification forming part of Letters Patent No. 131,129, dated September 3, 1872.

*To all whom it may concern:*

Be it known that I, DE WITT C. STERRY, 1st, of the city and county of Worcester, in the Commonwealth of Massachusetts, have invented a new and useful Machine for Shelling Corn; and I do hereby declare that the following is a clear, full, and exact description of the construction and operation of the same, reference being had to the annexed drawing making a part of this specification, in which—

Figure 1 is a sectional view of the machine. Fig. 2 is an inside view of the face-plate of the same and the cross-bar of the frame on which it is mounted. Fig. 3 is an interior view of one-half of the disk or front plate.

The letter A represents the face-plate, armed with short pointed teeth. At the top of this plate is a fluted or corrugated hopper, $a$, having slots for the passage of the teeth of the disk B. This hopper receives the ears of corn, and, being fluted, corrugated, and armed with teeth, holds the ear while the teeth of the disk roll it over and over and rake it clean of the kernels. This plate is represented in the drawing as screwed to the cross-bar $b\ b\ b\ b$ of the frame on which it is mounted. Fig. 3 represents one-half of the disk B or front plate armed with long conical teeth set in circular form. From the center of the disk, and forming a part of the same casting, a shaft, C, passes through the face-plate and cross-bar, bringing and holding the two described plates face to face. Near the periphery of the disk B is attached the crank or lever for operating the machine. This crank constitutes a part of the casting of the disk itself. C represents a center shaft passing from the disk through the face-plate and cross-bar of the frame, and terminating in a threaded end. D represents a spiral spring placed on the shaft C back of the cross-bar of frame, resting on a bearing attached to the cross-bar and held in place by a thumb-screw on the end of the shaft. The design of this spring is to regulate the friction of the teeth upon the corn and cob, thus adapting it by self-action, as it were, to every size and shape both of the full ears and the naked cobs. E represents a bearing for spiral spring fastened to cross-bar.

The operation of the machine is so simple and self-evident as to require but little description. The small end of the ear is placed in the hopper, and, turning the crank, the ear is drawn downward and rolled over and over, being held by the peculiar construction of the hopper long enough to be perfectly stripped by the shelling mechanism before the upper or large end of the ear has passed the central shaft, when the cob is rolled to the left of the shaft, brought up to the top of the face-plate, and thrown out on the back side of the sheller, thus completely separating the corn from the cobs, the shelled corn being received into a bag, box, or other receptacle beneath the machine and the cob disposed of as above, each revolution stripping an ear or delivering the corn and cobs, as stated.

The whole machine is made of metal castings; weighs only about twelve pounds; is simple, durable, and economical; will shell as much corn per hour or day as many of the larger and more costly hand-machines; is neat and noiseless; so light that a boy may carry it anywhere and operate it; so cheap in its cost as to place it within the easy reach of everybody.

What I claim as my invention, and for which I desire to secure Letters Patent, is—

The hand corn-sheller, as herein described and shown, consisting of the frame, stationary face-plate A with hopper $a$, rotating-disk B provided with crank-arm, central shaft C, spring D, and the adjusting devices $k\ l$, all constructed and arranged to operate substantially as specified.

DE WITT C. STERRY, 1ST.

Witnesses:
ASA L. KNEELAND,
LORA B. HOYT.